(12) United States Patent
Chen et al.

(10) Patent No.: US 7,339,301 B2
(45) Date of Patent: Mar. 4, 2008

(54) STATOR STRUCTURE OF MOTOR

(75) Inventors: Lee-long Chen, Taoyuan County (TW); Shih-ming Huang, Taoyuan County (TW); Wen-shi Huang, Taoyuan County (TW)

(73) Assignee: Delta Electronics, Inc., Taoyuan County (TW)

( * ) Notice: Subject to any disclaimer, the term of this patent is extended or adjusted under 35 U.S.C. 154(b) by 0 days.

(21) Appl. No.: 11/152,182

(22) Filed: Jun. 15, 2005

(65) Prior Publication Data
US 2005/0285471 A1 Dec. 29, 2005

(30) Foreign Application Priority Data
Jun. 23, 2004 (TW) .................. 93118063 A

(51) Int. Cl.
*H02K 1/00* (2006.01)
(52) U.S. Cl. .......................... 310/216; 310/51
(58) Field of Classification Search .............. 310/67 R, 310/216, 254, 51
See application file for complete search history.

(56) References Cited

U.S. PATENT DOCUMENTS

| | | | | |
|---|---|---|---|---|
| 4,355,249 A | * | 10/1982 | Kenwell | 310/49 R |
| 4,644,233 A | * | 2/1987 | Suzuki | 318/254 |
| 4,704,567 A | * | 11/1987 | Suzuki et al. | 318/254 |
| 5,420,471 A | * | 5/1995 | Yun | 310/216 |
| 5,798,583 A | * | 8/1998 | Morita | 310/42 |
| 5,967,763 A | * | 10/1999 | Horng | 417/423.7 |
| 6,285,108 B1 | * | 9/2001 | Horng | 310/259 |
| 6,407,473 B1 | * | 6/2002 | Horng et al. | 310/68 B |
| 6,624,541 B2 | * | 9/2003 | Horng et al. | 310/45 |
| 6,756,718 B2 | * | 6/2004 | Lee | 310/254 |

FOREIGN PATENT DOCUMENTS

| | | | | |
|---|---|---|---|---|
| JP | 03003622 A | * | 1/1991 | |
| JP | 11069668 A | * | 3/1999 | |
| JP | 2001119869 A | * | 4/2001 | |
| JP | 2002136003 A | * | 5/2002 | |
| JP | 2004222355 A | * | 8/2004 | |

* cited by examiner

*Primary Examiner*—Thanh Lam
(74) *Attorney, Agent, or Firm*—Birch, Stewart, Kolasch & Birch, LLP

(57) ABSTRACT

A stator structure comprising at least one first magnetic conductive plate and at least one second magnetic conductive plate, each magnetic conductive plate having a plurality of radial arms and pole tooth provided on ends of the radial arms, wherein the pole teeth of the first and second magnetic conductive plates have different shapes.

9 Claims, 5 Drawing Sheets

STATOR STRUCTURE OF MOTOR

RELATED APPLICATIONS

The present application is based on, and claims priority from, Taiwan Application Serial Number 93118063, filed Jun. 23, 2004, the disclosure of which is hereby incorporated by reference herein in its entirety.

BACKGROUND OF THE INVENTION (a) Field of the Invention

The present invention relates to a stator structure of a motor and, more particularly, to a stator structure easy to create starting offset for the motor.

(b) Description of the Related Art

In conventional designs for direct current brushless electric motors, starting offset must be created to eliminate the dead angle and thus to provide sufficient starting torque for all relative orientations between the stator and the rotor of the motor.

An conventional way of creating the starting offset is to have silicon steel sheets that constitute a stator structure be applied with uneven magnetic force. Referring to FIG. 1, one of the opposite sides of the pole tooth 104 is cut at its periphery to form a tangential plane, so that the gap D, measured from the tangential plane to the rotor 102, is larger than the gap d, measured from the side surface of the pole tooth 104 without the tangential plane, to result in different values of magnetic resistance. Accordingly, the starting offset is introduced by the asymmetry of the pole tooth 104. Except the formation of the tangential plane shown in FIG. 2A, in conventional method the asymmetry of the pole tooth 104 may be achieved by the formation of cambers with different curvatures at two sides, as in FIG. 2B, or the formation of a step portion at one side, as in FIG. 2C.

However, according to the conventional methods given above, the interval between the stator and the rotor are thus enlarged to lower the magnetic flux therebetween (the magnetic flux is in inverse proportion to the square of the distance) so that the torque of the motor is decreased. Also, the asymmetry of the pole tooth 104 is liable to be ill-formed to result in an inaccurate starting offset.

Further, when the starting offset is needs to be adapted to a different rotational sped, load, or threshold voltage, the silicon steel sheet must be replaced with a new one having a different interval between the stator and the rotor. This is costly and time-wasting.

BRIEF SUMMARY OF THE INVENTION

In view of this, an object of the invention is to provide a stator structure easy to create starting offset for a motor.

According to the invention, a stator structure includes a stack of at least one first magnetic conductive plate and at least one second magnetic conductive plate. Each magnetic conductive plate has a plurality of radial arms and pole teeth provided on ends of the radial arms, and each pole tooth has a first and a second side portions substantially symmetrical to each other with respect to the radial arm. The second magnetic conductive plate is identical with the first one except the first side portion of the second magnetic conductive plate is formed with a cut, and the first and second magnetic conductive plates are stacked in a manner that the magnetic center of a rotor in relation to each pole tooth is closer to the second side portion than the first one. The magnetic conductive plates may be silicon steel sheets.

Through the design of the invention, since all the magnetic conductive plates have identical radii R, from center to the outer periphery, the stator structure formed of a stack of them can keep the same small gap apart from the rotor to have larger torque and improved efficiency. Further, since the two sets of the magnetic conductive plates are pre-designed to have the mere difference of the cut, when the offset angle θ is needed to be adapt to a different rotational speed, load or threshold voltages, the adjustment of the offset angle θ accompanied by the alternation to the magnetic action area is easy to be achieved only by varying the respective numbers of the first and second magnetic conductive plates in a stack. Thereby, the magnetic conductive plate is not needed to be replaced with a new one to change the starting offset, and thus the manufacture cost and labor time are considerably reduced.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
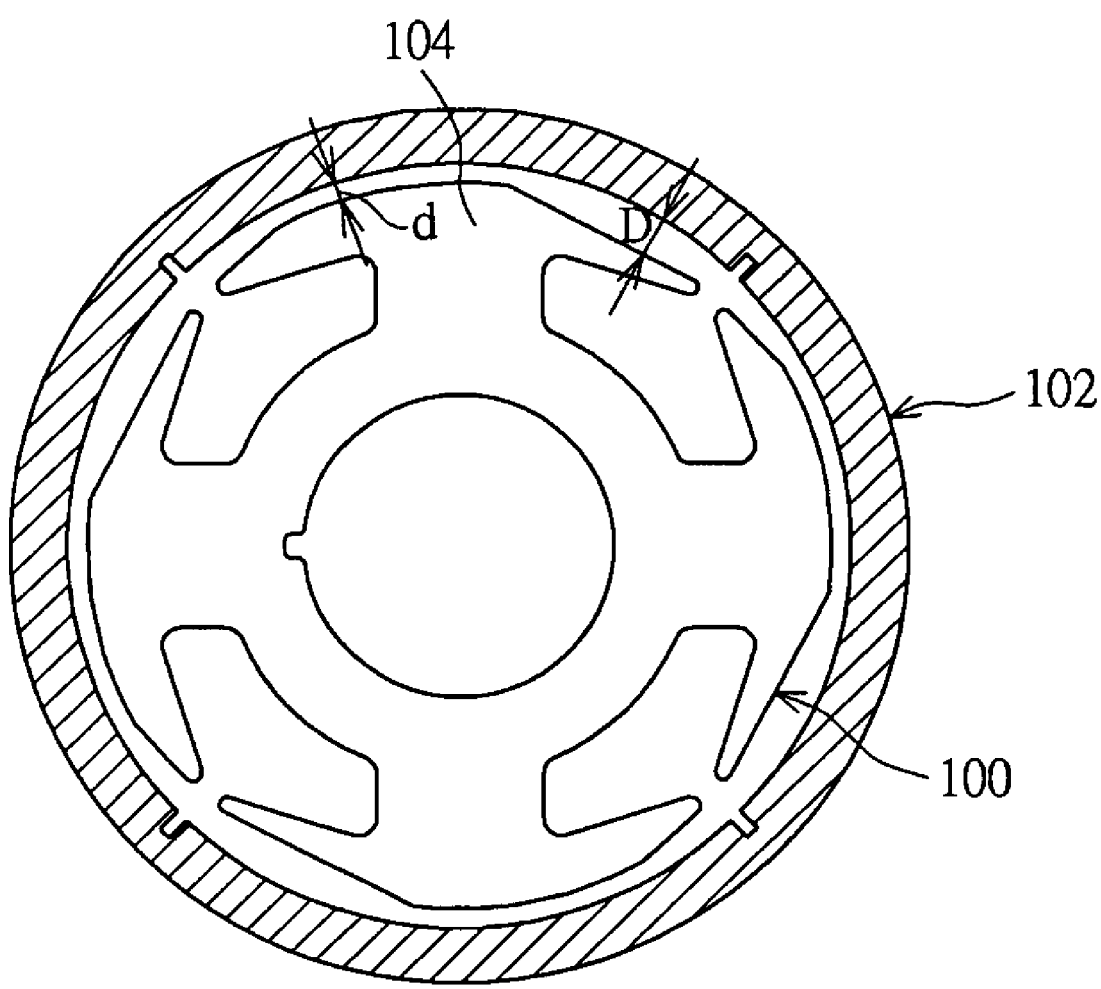
FIG. 1 and FIG. 2 show schematic views illustrating conventional ways of creating starting offset for a motor.
Figure 2A:
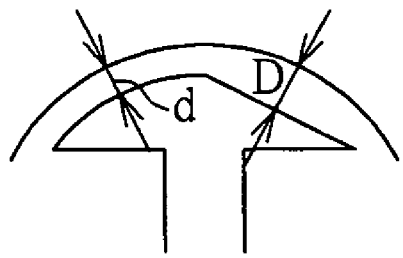
Figure 2B:
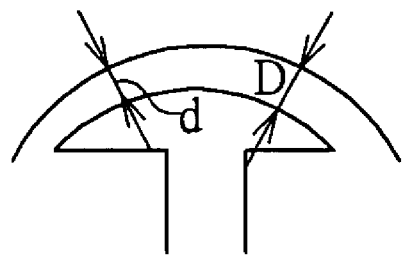
Figure 2C:
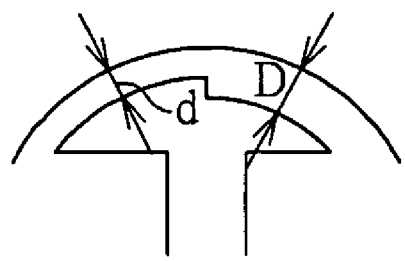
Figure 3A:
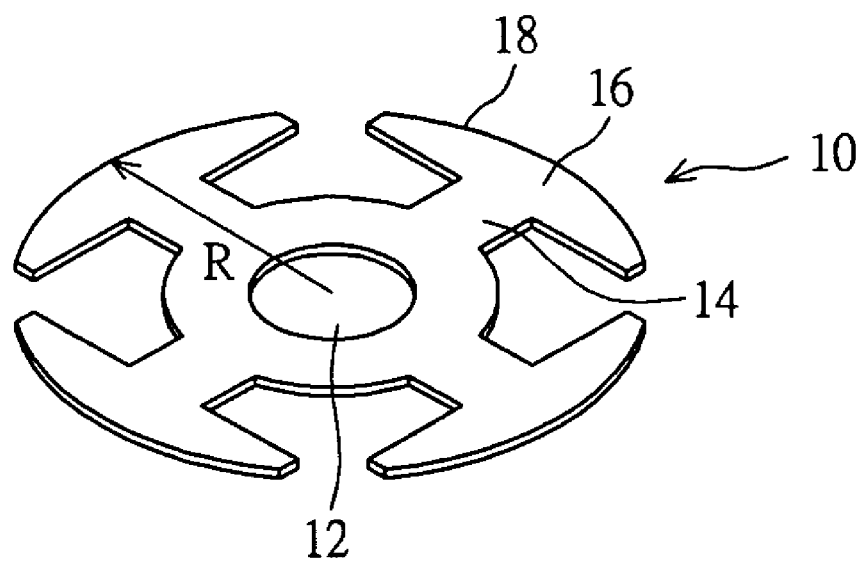
FIG. 3A and FIG. 3B show schematic views illustrating two different sets of silicon steel sheets that together constitute the stator structure of the invention.
Figure 3B:
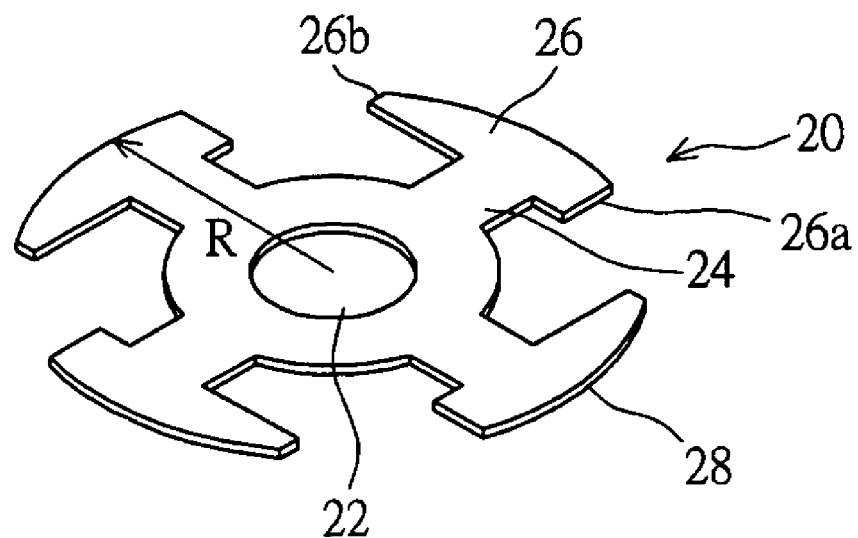

FIG. 3A and FIG. 3B show schematic views illustrating two different sets of silicon steel sheets that together constitute the stator structure of the invention. The stator structure of the invention is a stack of magnetic conductive plates such as two different sets of silicon steel sheets. Referring to FIG. 3A, the first silicon steel sheet 10 is provided with an opening 12 at its central location and radial arms 14 surrounding the opening 12 and extending outwardly and radially from the center to allow a coil (not shown) to be wrapped thereon. Each radial arm 14 is provided with a pole tooth 16 at its end, spanning tangential to the extending direction of the radial arm 14. The outer periphery 18 of the pole tooth 16 constitutes the magnetic action surface of the stator structure interacted with a rotor (not shown).

The second silicon steel sheet 20, provided with an opening 22 and four radial arms 24 having their respective pole teeth 26, is identical with the first silicon steel sheet 20 in shape as well as the radius R from center to the outer periphery. The pole teeth 16 of the first silicon steel sheet 10 and the pole teeth 26 of the second silicon steel sheet 20 have different shape or magnetic action area. For example, the shape or magnetic action area of a side portion 26a of the first silicon steel sheet 20 is different from a side portions 26b of the first silicon steel sheet 20. The side portion 26a has at least one cut, notch or through hole. The section of the cut, notch or through hole is parallel to the extending direction of the radial arm.

In this embodiment, the section of the cut is parallel to the extending direction of the radial arm 24. Also, the dimension of the cut is not limited and is determined according to the actual demand. Further, the numbers of the radial arms 14 and 24, though exemplified as four units, is not limited and is selected by the pole number of the motor.

Figure 4:
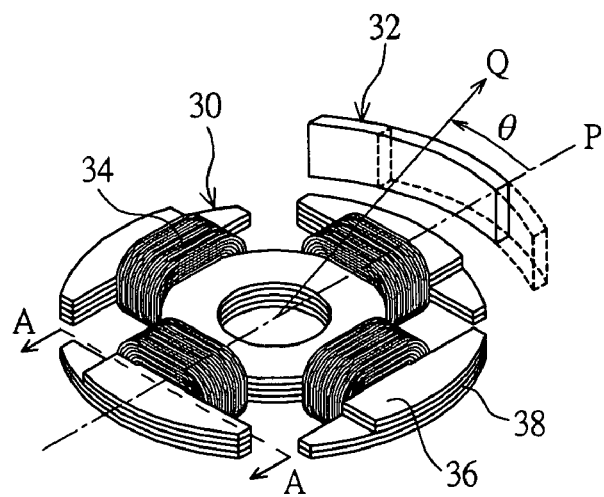
FIG. 4 illustrates a stator structure according to an embodiment of the invention.

FIG. 4 illustrates a stator structure 30 composed of a stack of the first silicon steel sheet 10 and the second silicon steel sheet 20.

Referring to FIG. 4, two second silicon steel sheets 20 having cuts are stacked on two silicon steel sheets 10 without cuts, and further a coil 34 is wrapped on their radial arms, with their outer peripheries 38 being aligned to each other to constitute a magnetic action surface interacted with a rotor.

Figure 5:
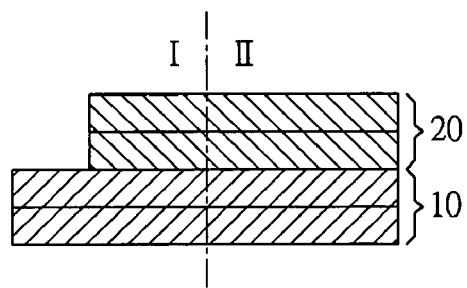
FIG. 5 shows a cross-section of the stator structure cut along A-A line in FIG. 4.

FIG. 5 shows a cross-section of the stator structure 30 cut along A-A line in FIG. 4. Referring to FIG. 4 and FIG. 5, when the magnetic action surface is divided into two parts along the center line P of one of the pole tooth, the magnetic action area of the left part I is smaller than that of the right part II because of the formation of the cut. Hence, the magnetic center of the rotor in relation to each pole tooth is closer to right part II (the half part without the cut) to reach magnetic force balance, thus forming an offset angle θ as indicated in FIG. 4.

Through the design of the invention, since all the silicon steel sheets have identical radii R, from center to the outer periphery 18, the stator structure formed of a stack of them can keep the same small gap apart from the rotor to have larger torque and improved efficiency.

Further, since the two sets of the silicon steel sheets are pre-designed to have the mere difference of the cut, when the offset angle θ is needed to be adapt to a different rotational speed, load or threshold voltages, the adjustment of the offset angle θ accompanied by the alternation to the magnetic action area is easy to be achieved only by varying the respective numbers of the first and second silicon steel sheets in a stack. Thereby, the offset angle of the stator structure can be charged without re-molding, and thus the manufacture cost and labor time are considerably reduced.

Further, referring to FIG. 5, since the second silicon steel sheets 20 are stacked above the first magnetic conductive plates 10, the lower half part of the stator structure has a downward magnetic pressure applied on the rotor to obviate the axial vibration of the motor.

Figure 6A:
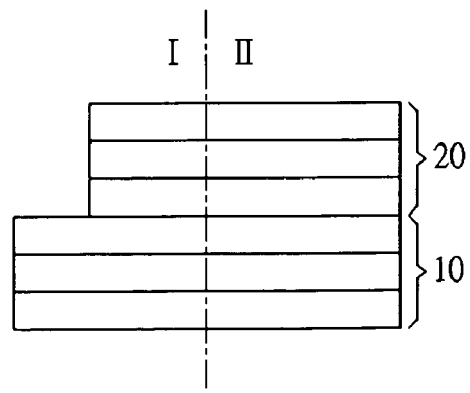
FIG. 6A and FIG. 6B illustrate stack modifications of the magnetic conductive plates.
Figure 6B:
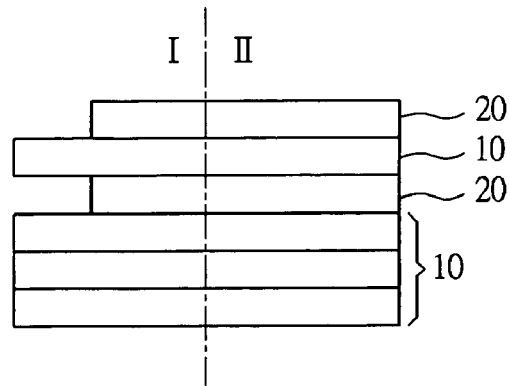

According to the invention, the respective numbers and stack style of the two sets of silicon steel sheets are not limited, and they are only to create different magnetic action area with respect to two half parts divided along the center line P of a radial arm. For example, the silicon steel sheet 20 having cuts may be stacked to be adjacent to one another, as in FIG. 6A, or the first and the second silicon steel sheet may be alternately stacked, as in FIG. 6B.

Figure 7:
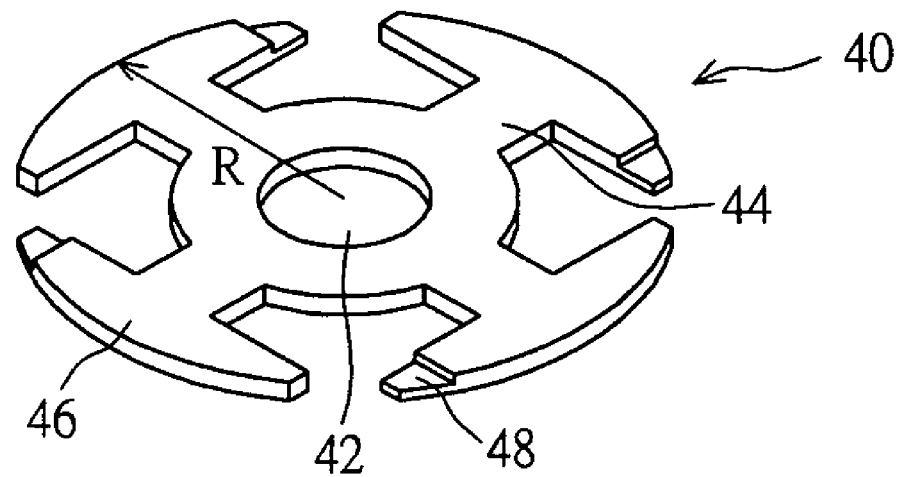
FIG. 7 shows a schematic diagram illustrating another embodiment of the invention.

FIG. 7 shows a schematic diagram illustrating another embodiment of the invention. Referring to FIG. 3A and FIG. 7, in this embodiment, the stator structure is a stack of silicon steel sheet 10 and silicon steel sheet 40. The two sets of the silicon steel sheet 10, 40 are equally provided with identical openings 12, 42, radial arms 14, 44, and pole teeth 16, 46, as in the afore said embodiment, except one side portion of the silicon steel sheet 40 is notched out to form a step portion 48. Hence, the adjustment of the offset angle θ accompanied by the alternation to the magnetic action area is also easy to be achieved only by varying the respective numbers of the silicon steel sheets 10, 40.

Figure 8:
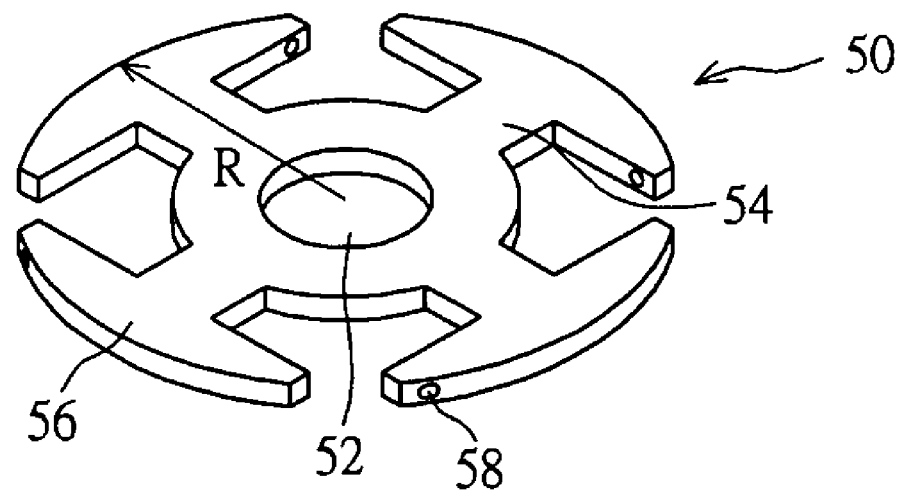
FIG. 8 shows a schematic diagram illustrating another embodiment of the invention.

Alternatively, as shown in FIG. 8, a silicon steel sheet 50 is provided with an opening 52, radial arms 54 and pool tooth 56. The pool tooth 56 may be dug on its outer periphery to form at least one through hole 58 at its one side to alter the magnetic action area.

Hence, according to the invention, simply as all the pole teeth maintain identical lengths from their outer periphery to the center of the magnetically conductive sheet, at least one set of the magnetically conductive sheets may be provided with cuts, notches, or through holes to alter the magnetic action area, and the adjustment of the offset angle θ accompanied by the alternation to the magnetic action area is also easy to be achieved.

While the invention has been recited by way of examples and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A stator structure comprising at least one first magnetic conductive plate and at least one second magnetic conductive plate, each magnetic conductive plate having a plurality of radial arms and pole teeth provided on ends of the radial arms, wherein one of the pole teeth of the at least one second magnetic conductive plate has a first and a second side portions unsymmetrical to each other with respect to the radial arm, each pole tooth of the at least one first magnetic conductive plate has a first side portion and a second side portion, both of which are symmetrical to each other with respect to the radial arm, and the magnetic center of the combined pole teeth by combining the pole teeth of the at least one first and at least one second magnetic conductive plates is circumferentially offset.

2. The stator structure as recited in claim 1, wherein the pole teeth of the second magnetic conductive plate has a first side portion and a second side portion with respect to the radial arm, and the shape of a first side portion is different from that of a second side portion.

3. The stator structure as recited in claim 2, wherein the magnetic center of a rotor in relation to each pole tooth is close to the second side portion.

4. The stator structure as recited in claim 1, wherein the second magnetic conductive plate has at least one cut, notch or through hole.

5. The stator structure as recited in claim 4, wherein the section of the cut, notch or through hole is parallel to the extending direction of the radial arm.

6. The stator structure as recited in claim 1, wherein the first and second magnetic conductive plates are silicon steel sheets, respectively.

7. The stator structure as recited in claim 1, wherein the first and second magnetic conductive plates are stacked to be adjacent to one another.

8. The stator structure as recited in claim 1, wherein the first and second magnetic conductive plates are alternately stacked.

9. The stator structure as recited in claim 1, wherein the second magnetic conductive plate is above the first magnetic conductive plate.

* * * * *